United States Patent [19]

Smith, Jr.

[11] 4,246,836
[45] Jan. 27, 1981

[54] APPARATUS FOR PROCESSING PARTICULATE SOLIDS

[75] Inventor: Horace L. Smith, Jr., Richmond, Va.

[73] Assignee: Smitherm Industries, Inc., Richmond, Va.

[21] Appl. No.: 628,916

[22] Filed: Nov. 5, 1975

[51] Int. Cl.³ .............................................. A23B 7/00
[52] U.S. Cl. ................................... 99/478; 99/516
[58] Field of Search .............. 99/467, 469, 470, 471, 99/473, 474, 476, 477, 478, 516; 34/57 A, 168, 173; 259/DIG. 17

[56] References Cited

U.S. PATENT DOCUMENTS

| | | | |
|---|---|---|---|
| 1,704,650 | 3/1929 | Brand | 99/479 |
| 3,009,689 | 11/1961 | Hinz | 34/173 |
| 3,028,681 | 4/1962 | Jorman et al. | 34/57 A |
| 3,285,157 | 11/1966 | Smith, Jr. | 99/476 |
| 3,329,506 | 7/1967 | Smith | 99/468 |
| 3,434,410 | 3/1969 | Galle | 99/469 X |
| 3,615,668 | 10/1971 | Smith, Jr. | 34/57 A X |
| 3,730,731 | 5/1973 | Smith, Jr. | 99/478 X |
| 3,736,775 | 6/1973 | Smith | 68/23 |
| 3,807,705 | 4/1974 | Humkey et al. | 259/DIG. 17 X |
| 3,823,662 | 7/1974 | Smith, Jr. | 99/468 |

Primary Examiner—Harvey C. Hornsby
Assistant Examiner—Arthur O. Henderson

[57] ABSTRACT

Reactors in which solids can be processed by fluid-solids contact. The reactors include a shell housing a rotatable, movable assembly or rotor for supporting a bed of solids and for displacing the solids from a first location where they are introduced into the reactor to a second location where they are discharged. As the solids are displaced, process fluid is directed upwardly through the bed in a manner which causes the solids to circulate and come into intimate and uniform contact with the process fluid.

3 Claims, 5 Drawing Figures

APPARATUS FOR PROCESSING PARTICULATE SOLIDS

This invention relates to novel, improved apparatus for processing particulate solids.

The apparatus disclosed herein is particularly useful for roasting coffee; and the principles of the invention will, accordingly, be developed primarily by relating them to this application. It is to be understood, however, that this is for convenience and clarity and is not intended to impose any limitation on the scope of protection to which I consider myself entitled.

My U.S. Pat Nos. 3,615,668 issued Oct. 26, 1971; 3,724,909 issued Apr. 3, 1973; 3,730,731 issued May 1, 1973; and 3,823,662 issued July 16, 1974, disclose novel roasters for roasting coffee by a continuous as opposed to batch-type process. In these roasters a rotatable assembly displaces the beans from a first location where green beans are introduced into the roasting vessel to a second location where roasted beans are discharged.

As the beans are displaced, they are roasted by a heated fluid, which will typically be an inert gas such as nitrogen. The roasting fluid is directed upwardly through the bed by the apertures in a stationary nozzle plate located in the lower reaches of the roasting vessel or reactor. This causes the beans being roasted to circulate in a pattern which produces uniform and intimate contact between the fluid and the beans and, as a consequence, efficient and uniform roasting of the beans.

From the practical viewpoint the novel roasters disclosed in my issued patents have the disadvantages that the velocity of the roasting fluid through the roaster must be closely controlled. If the fluid velocity is too low the circulation of the beans relied upon to obtain uniform roasting will not be obtained. On the other hand, if the fluid velocity is too high, beans can be carried from the roasting vessel by the fluid. This not only wastes the beans but can adversely affect the operation of the roasting apparatus.

I have now discovered that the need for controlling the velocity of the roasting fluid within close limits can be eliminated and the problem of beans being carried out of the roaster nevertheless avoided by using an appropriate deflector. This device is preferably incorporated in the movable assembly by which the beans are displaced around the roaster during the roasting cycle.

As the beans circulate upwardly, the deflector directs them laterally and downwardly out of the mainstream of the upwardly flowing, roasting fluid. This insures that they are not carried out of the roaster by the fluid.

A not unrelated benefit of the deflector is that higher flow velocities of the roasting fluid can be used than would otherwise be the case. This is advantageous in that a greater scouring effect of the roasting fluid on the beans can be obtained. The result is more efficient heat transfer, a shorter roasting time, and a corresponding increase in the capacity of the roaster, a decided benefit from the economic viewpoint.

Coffee roasters with deflectors are illustrated and described in my earlier U.S. Pat. Nos. 3,189,460 issued June 15, 1965, and 3,285,157 issued Nov. 15, 1966. However, those deflectors do not function in the manner of the ones disclosed herein and discussed above. They are instead provided to direct the beans being roasted from one roasting channel into a succeeding one or into a dwell zone from which they are reintroduced into the same or a different roasting channel.

Another feature of the novel coffee roasters described herein is an improved construction of the movable assembly or rotor by which the beans are displaced from the location where they are introduced into the reactor to that where they are discharged during the roasting cycle.

The movable assemblies or rotors described in my U.S. Pat. Nos. 3,615,668; 3,724,909; 3,730,731; and 3,823,662 have a vertical, cylindrical sleeve to which radial partitions are attached. The rotor cooperates with the shell of the reactor or roaster and with a fixed assembly composed of frustoconical inner and outer supports and an annular orifice plate to support the bed of beans. The radial partitions divide the bed into segments, which promotes uniform roasting, and effect the displacement of the beans during the roasting cycle.

The orientation of the orifices in the nozzle plate and the frustoconical supports produce an interaction between the roasting fluid and the beans that brings about the wanted circulation of the beans in each segment of the bed. This, too, promotes uniform and efficient roasting of the beans.

I have now discovered that significant benefits can be derived by adding to a rotor as described above a cylindrical outer shroud or wall to which the outer edges of the radial partition are attached. This novel modification strengthens the rotor and facilitates its construction. Also, dimensional tolerances are much less critical. The need for maintaining the gaps between the vertical partitions of the rotors and the shell of the reactor small enough to keep the beans from passing from one segment of the bed to the next is eliminated as the outer sleeve, not the reactor shell, delineates the outer boundary of the bed.

Also, in the novel rotors disclosed herein, the lower part of the outer sleeve has a downwardly and inwardly inclined, frustoconical configuration; and a similarly configured, but outwardly inclined, cooperating member constitutes the lower end of the inner rotor sleeve. This eliminates the need for the frustoconical supports disclosed in my earlier patents, again producing a simpler and therefore more economical construction.

In the novel rotor construction described above provision is preferably made for keeping beans from falling into the space between the rotor and the roaster shell as they enter the roaster. This is easily and inexpensively accomplished by dividing the outer rotor sleeve into a lower member and an upper member spaced inwardly from the lower one. A deflector is fixed to the reactor shell with its lower edge opposite a gap between the upper and lower, outer sleeve members. Any beans which fall outside the upper sleeve member impinge on the deflector and are directed by it into the interior of the movable assembly.

Another optional, but preferred, feature of the reactors disclosed herein is a simplified arrangement for supporting and rotating the movable assembly.

In my previously disclosed, continuous roasters the rotor is supported on a large, ringlike bearing. It is rotated by a shaft extending to the exterior of the reactor and carrying a pinion which meshes with an internal ring gear in the rotor.

I have now discovered that this relatively complex arrangement is unnecessary. The rotor can instead be supported by a simple thrust bearing and coupled directly to the drive shaft, eliminating the ring gear and pinion.

The motor and other drive components can be mounted on the top of the reactor shell and there drive-connected to the rotor drive shaft. This arrangement is simple and, also, facilitates the mounting of other process equipment beneath the reactor.

As indicated above, coffee roasting is by no means the only type of fluid-solids process in which reactors in accord with the principles of the present invention may be used. Other applications of the present invention include the roasting of other food products such as cocoa beans and nuts and the manufacture of expanded food products such as puffed cereal grains. The present invention may also be used for drying food products and other particulate solids and for effecting a wide variety of chemical reactions commonly carried out in fluidized beds. In short, the present invention is applicable to many processes involving the contact of fluids with particulate solids.

From the foregoing it will be apparent to the reader that one important and primary object of the present invention resides in the provision of novel apparatus for processing particulate solids by fluid-solids contact in a continuous as opposed to batch-type manner.

A related, important and primary object is the provision of novel, improved coffee roasters in which the beans are roasted in a continuous as opposed to batch-type manner.

Yet other important objects reside in the provision of apparatus in accord with the preceding objects:

1. which makes the flow velocity of the roasting or other processing fluid through the roaster or reactor less critical than it has heretofore been;

2. which permits higher flow velocities of the fluid to be employed, thereby increasing the capacity of the roaster or reactor, for example;

3. which accomplishes the above-enumerated goals be deflecting the coffee beans or other solids being processed out of the mainstream of the process fluid so that the solids will not be carried out of the roaster or reactor by the fluid;

4. which accomplishes the goals identified in objects 1, 2, and 3 in a simple and economical manner;

5. which has a rotor or movable assembly of improved construction for displacing the solids being processed from one to the other of two locations in the reactor during the process cycle;

6. which, in conjunction with the preceding object, has a rotor of a construction which is strong and durable and eliminates the need for maintaining close tolerances between the movable assembly and the shell of the reactor;

7. which, in conjunction with object 5, simplifies the reactor by making it possible to eliminate certain of the components heretofore relied on to effect a circulation of the solids in the reactor during the process cycle;

8. which has a simplified arrangement for supporting and rotating the movable assembly;

9. which has various combinations of the foregoing attributes.

Other objects of my invention and additional advantages and features of the same will be apparent from the appended claims and as the ensuing detailed description and discussion proceeds in conjunction with the accompanying drawing, in which:

Figure 1:
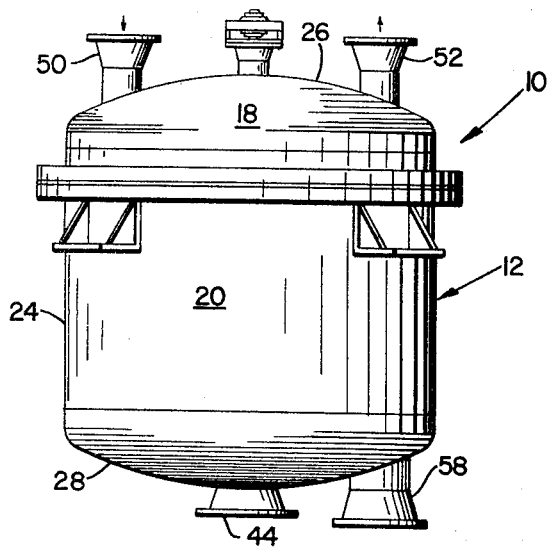
FIG. 1 is an elevation of a reactor constructed in accord with and embodying the principles of the present invention.

Referring now to the drawing, the reactor 10 illustrated in FIG. 1 thereof is constructed in accord with and embodies the principles of the present invention. This reactor may be employed in a wide variety of applications involving the contact of particulate solids and a process fluid. For the sake of clarity and convenience, the reactor will be described as a coffee roaster with the understanding that this is in no way intended to limit the scope of protection to which I consider myself entitled.

Figure 2:
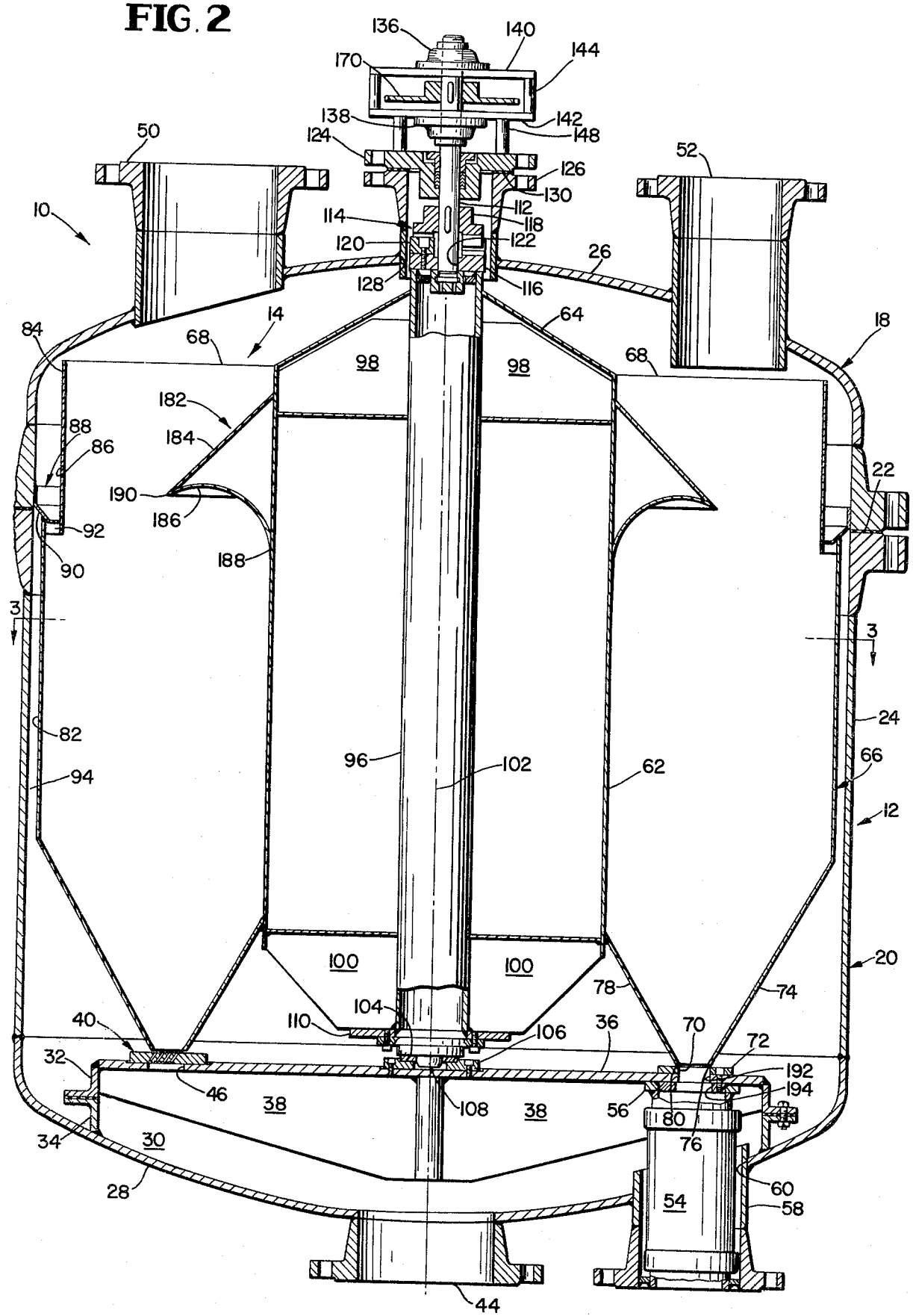
FIG. 2 is a vertical section through the reactor.

As best shown in FIG. 2, reactor 10 includes a shell 12 housing a rotatable, movable assembly or rotor 14 which supports a bed 16 of beans (see FIG. 4) during the roasting cycle and displaces the beans from one location where green beans are introduced into the bed to a second location where roasted beans are discharged.

Reactor shell 12 is composed of upper and lower, bolted together, flanged sections 18 and 20 between which a seal 22 is disposed. The reactor shell has a generally cylindrical side wall 24 and top and bottom walls 26 and 28. The precise configuration of the shell is not critical and can be varied to meet the exigencies of a particular application.

The shell can be fabricated of any suitable structural material, again depending upon the particular application of the invention. For coffee roasting, it will preferably be built to withstand pressures well above atmospheric. Pressures on the order of 130–150 psig have proved advantageous in many cases, and my prior U.S. Pat. No. 3,145,180 issued Oct. 3, 1967, discloses that pressures on the order of 300 psig can also be used to advantage in coffee roasting.

An inlet plenum 30 for a roasting fluid is located in the lower reaches of reactor shell section 20. The plenum is formed by bolted together, angle sectioned rings 32 and 34 disposed in mirror image relationship and a circular support plate 36. The lower ring 34 is selaed as by welding to the bottom wall 28 of the reactor shell, and plate 36 is similarly fixed to upper ring 32.

Radially extending stiffeners 38 are fixed to the lower side of support plate 36 and to the upper support ring 32. These increase the rigidity of the support plate.

Mounted on support plate 36 is an annular array 40 of nozzle plates 42. Roasting fluid supplied to plenum 30 through inlet 44 flows through openings 46 in plate 36 and through orifices 48 in nozzle plates 42 into the bed of beans.

An inlet 50 for green or unroasted beans and an outlet 52 for the roasting fluid communicate with the interior of reactor 10 through the top wall 26 of shell 12.

Roasted beans are discharged from the reactor via a discharge conduit 54 which is a corrugated metal hose in the illustrated embodiment of my invention. The conduit extends from an apertured discharge flange 56 fixed to the lower side of support plate 36 to the exterior of the roaster through a sleeve 58. The sleeve is fixed as by welding in an opening 60 through the bottom wall 28 of reactor shell 12.

The lower end of conduit 54 communicates with a lock (not shown) through which the roasted beans are transferred to a cooler (not shown) which is preferably of the character disclosed in companion Application Ser. No. 628,907, now U.S. Pat. No. 4,194,444 filed this same day.

The rotor housed in shell 12 includes an inner, cylindrical sleeve 62 with a frustoconical cover 64 and an outer, cylindrical sleeve or shroud 66 spaced from the side wall 24 of shell 12. These sleeves delineate the boundaries of bed 16.

Radially oriented partitions 68 extend between and are fixed to the inner and outer sleeves. In the illustrated reactor, there are 16 such partitions (see FIG. 3). They divide the interior of the rotor and the bed 16 of solids therein into 16 equal, radially extending segments to which the beans introduced into them are confined to insure uniform roasting. The partitions also effect displacement of the beans around reactor 10 from inlet 50 to a dump opening 70 above discharge conduit 54 in an otherwise imperforate segment 72 of nozzle plate array 40 as movable assembly 14 is rotated.

The lower part 74 of outer sleeve 66 tapers inwardly and terminates in an edge 76 slightly spaced from or in rubbing contact with nozzle plates 42 adjacent the outermost orifices 48. Inner sleeve 62 is composed of two members, the frustoconical lower one 78 tapering outwardly to a lower edge 80 which is also slightly spaced from or in rubbing contact with nozzle plates 42 but adjacent the innermost orifices therein. This combination of tapered members confines the upwardly flowing roasting fluid to bed 16 and also forms the bed into a configuration which makes the roasting fluid capable of circulating the beans of which it is composed in the pattern shown in FIG. 4.

In the illustrated embodiment of my invention the outer sleeve 66 of movable assembly 14 is composed of a lower member 82 and a telescoped upper member 84 which is fitted into notches 86 in partitions 68 (see FIG. 2). A sheet metal particle deflector 88 is fixed to the side 24 of reactor shell 12 with an inwardly inclined, lower portion 90 thereof extending into the gap 92 between the telescoped shroud members.

This novel arrangement keeps beans supplied to the reactor through inlet 50 from falling into the annular space 94 between rotor 14 and reactor shell 12. Any beans which fall outside upper shroud member 84 drop onto deflector 88 and slide down its inclined part 90 and through gap 92 into the interior of the rotor.

The inner and outer sleeves and radial partitions 68 are assembled into a unit as by welding. This unit is fixed to a central, hollow, support tube or shaft 96 by radially extending brackets 98 at the upper end of the shaft and by similar brackets 100 at its lower end. These brackets extend between and are fixed to shaft 96 and to inner sleeve 62.

Movable assembly 14 is supported in reactor shell 12 for rotation about a vertical axis 102 on a thrust bearing 104. The thrust bearing, which may be a Graphalloy washer, is seated in an adapter ring 106 bolted to the circular support plate 36 in shell 12. A flanged stud 108 bolted to a rotor support plate 110 at the lower end of shaft 96 extends through the thrust bearing to center or position the lower end of the rotor.

Figure 5:
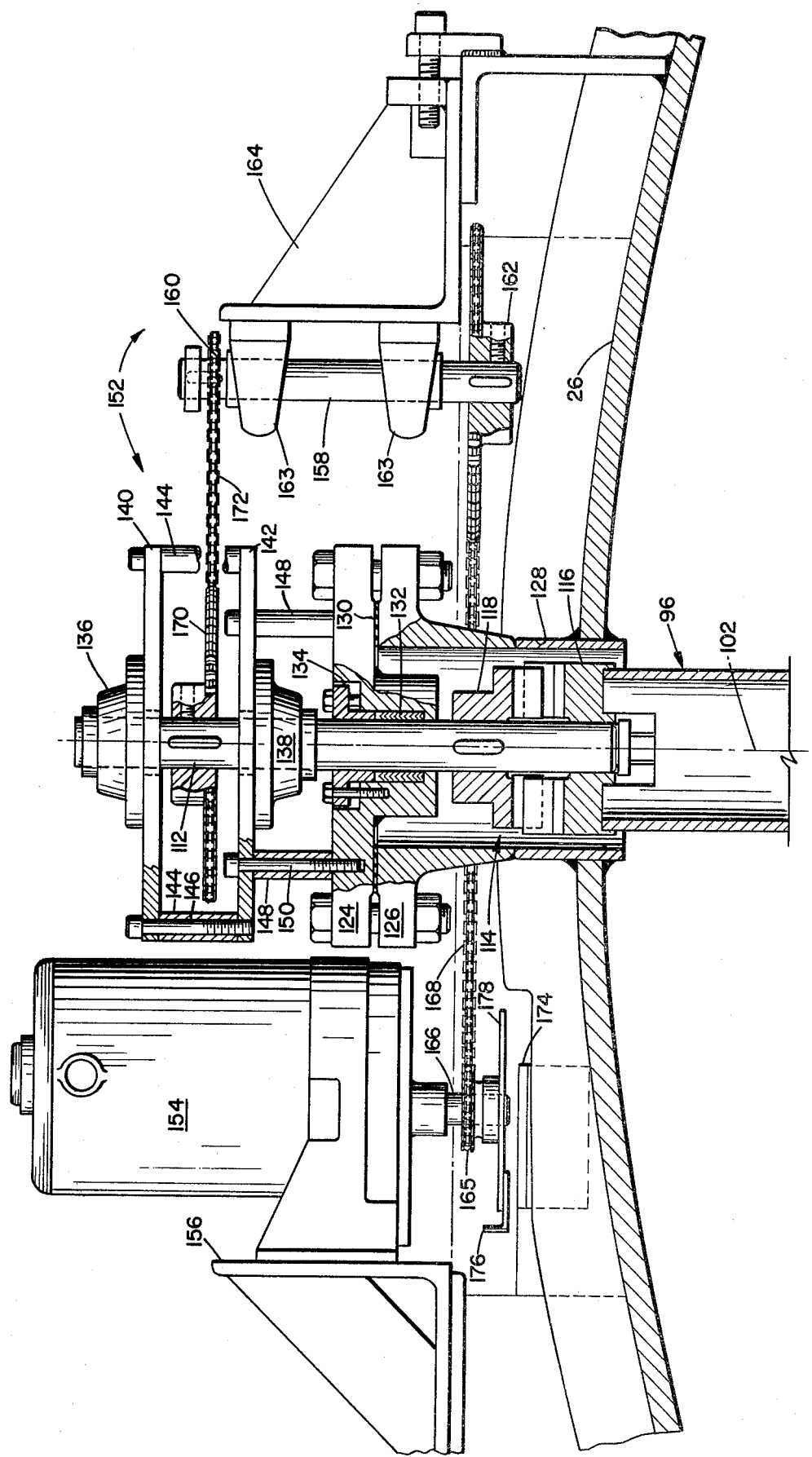
FIG. 5 is a vertical section through the top of the reactor and a rotor drive assembly supported therefrom.

At the upper end of rotor 14 central shaft 96 is connected to a rotor drive shaft 112 by a clutch 114 which includes a driven or output member 116 fixed to the upper end of shaft 96, a drive element 118 keyed to the lower end of drive shaft 112, and a coupling key 120 which drive connects the two clutch elements (see FIGS. 2 and 5).

Although not essential, the clutch just described or a comparable arrangement which will permit the drive shaft to be coupled to rotor 14 from the exterior of reactor shell 12 is preferred. This simplifies to a considerable extent the assembly of the reactor.

The lower end of drive shaft 112 is seated in a recess 122 in clutch output element 116 to center the upper end of rotor 14.

The shaft extends upwardly through an adapter flange 124 and a flanged sleeve 126 to the exterior of reactor shell 12. Sleeve 126 surrounds the drive shaft and clutch members and is fixed in an opening 128 formed in the top wall 26 of shell 12. A seal 130 between adapter flange 124 and sleeve 126 and packing 132 secured between the flange and shaft 112 by a gland 134 keep roasting fluid from escaping to the exterior of the roaster.

The upper end of drive shaft 112 is rotatably journalled in bearings 136 and 138. These bearings are mounted on plates 140 and 142.

Plate 140 is supported from plate 142 by tubular spacers 144 and fasteners 146, and plate 142 is similarly supported from adapter flange 124 by spacers 148 and fasteners 150.

Drive shaft 112 and rotor 14 are rotated by a drive assembly 152 which includes a motor 154 supported from the top wall 26 of reactor shell 12 by a bracket 156. The drive assembly also includes a jackshaft 158 to which pinions 160 and 162 are keyed. The jackshaft rotates in pillow blocks 163 supported from the top wall 26 of reactor shell 12 by adjustable bracket 164.

Motor 154 rotates pinion 160 and, therefore, jackshaft 158 and pinion 162 via a pinion 165 keyed to its output shaft 166 and a conventional roller chain 168.

Jackshaft pinion 162 is drive-connected to and rotates a pinion 170 through roller chain 172. Pinion 170 is keyed to the upper end of drive shaft 112 between bearings 136 and 138. Therefore, energization of motor 154 results in the rotation of the movable assembly about axis 102.

Figure 3:
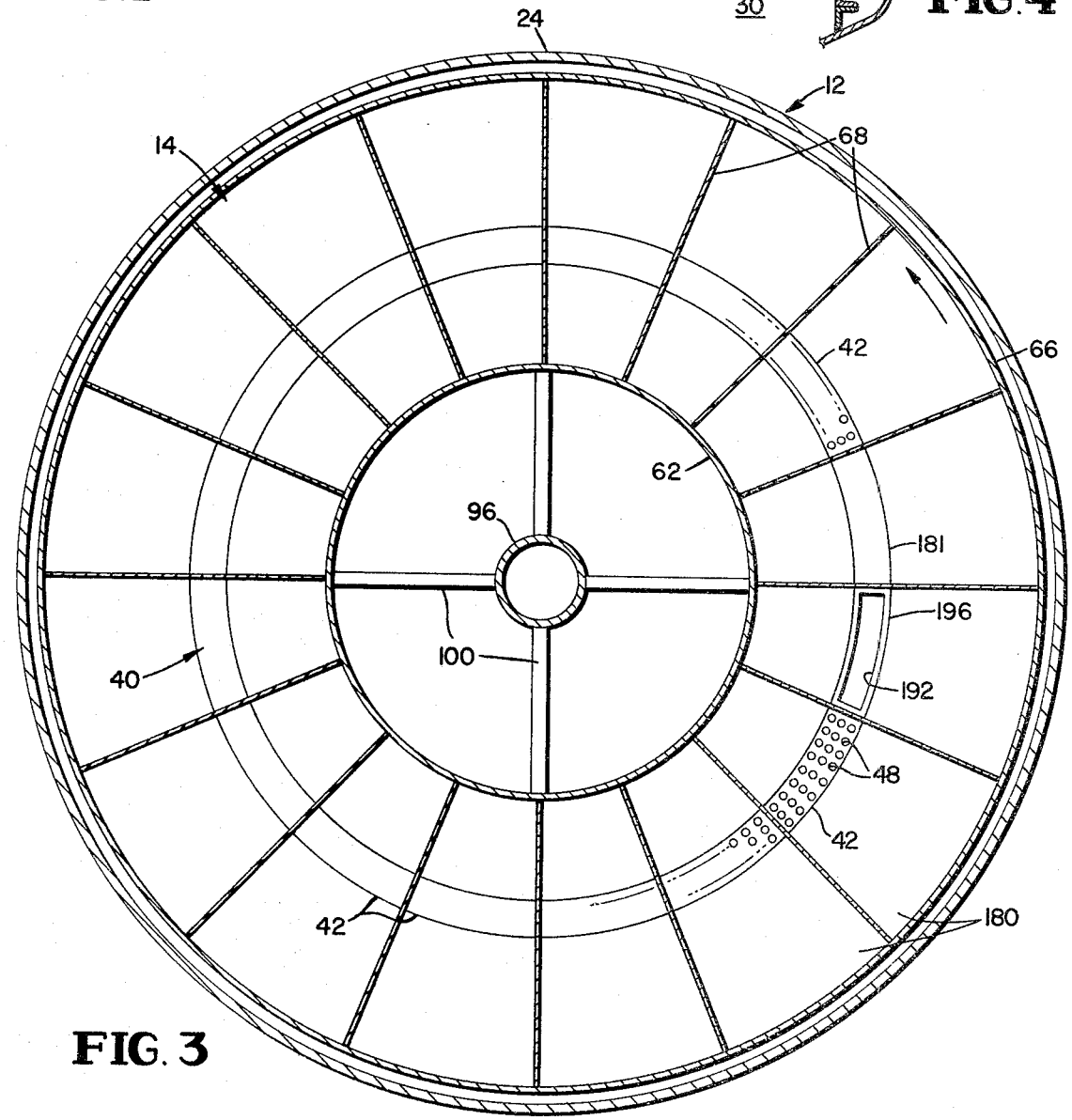
FIG. 3 is a generally diagrammatic horizontal section through the reactor.

Motor 154 is controlled by a control system including a microswitch 174 supported from upper wall 26 of reactor shell 12 by the bracket 156 on which the motor is mounted (see FIG. 3). The switch has an actuator (not shown) operated by a cam 176 on an adjustable timing disc 178 fastened to motor output shaft 166. The motor control circuitry in which these components are incorporated may be of the character described in my U.S. Pat. Nos. 3,730,731 and 3,823,662 and will accordingly not be described herein.

Figure 4:
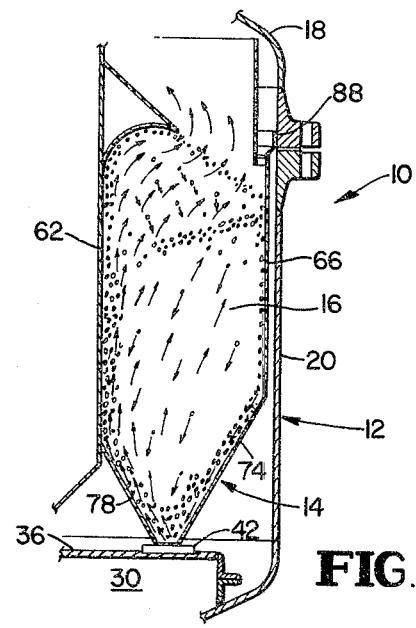
FIG. 4 is a partial and diagrammatical vertical section through the reactor showing circulation patterns of the particulate solids and the process fluid.

In the operation of reactor 10, plenum 30 is supplied with heated roasting fluid through inlet 44. From the plenum, the roasting fluid flows upwardly through nozzles or orifices 48, into and through the bed of beans 16 as shown in FIG. 4, and into outlet duct 52. This causes the beans in each of the segments 180 of bed 16 to circulate in the vertical pattern shown in the same Figure. As in my previously patented reactors having a similar circulating pattern, this results in efficient and uniform roasting of the beans.

After exiting from the roaster, the fluid is typically cleaned, reheated, and recirculated to the reactor as described in my issued U.S. Pat. Nos. 3,730,731 and 3,823,662, for example.

Unless the velocity of the roasting fluid through the bed is carefully controlled, it may be high enough to carry beans from the bed with it through outlet 52. As indicated above, this is undesirable because of the loss of product and because of the maintenance problems which may be engendered by the entry of beans into the roasting gas circulation system.

In the illustrated reactor 10 excess exit velocity of the roasting fluid is eliminated as a problem by a novel deflector 182 fixed to the inner sleeve 62 of rotor 14 at the upper end thereof (see FIGS. 2 and 4). This deflector includes a frustoconical upper member 184 and an arcuately sectioned, annular, lower member 186. The slope of lower member 186 changes from steeply and upwardly inclined at its inner edge 188 to a downward direction at its outer edge 190.

As shown by FIG. 4, the beans moving upwardly in the inner region of bed 16 for the most part continue upwardly until they reach the lower member 186 of deflector 182 and are then directed outwardly and downwardly out of the mainstream of the roasting fluid. Some of the beans will have so little energy after contacting the deflector that they will fall back into bed 16. Those beans having higher velocities will be directed against the outer sleeve 66 of the rotor and rebound into the bed.

It is important, in this regard, that there be sufficient distance between the deflector and the upper surface of the bed that the beans will be deflected against the outer rotor sleeve rather than back against the bed. This keeps the faster moving beans from ricocheting off the bed and back into the stream of exiting roasting fluid.

The precise distance which must be left will of course depend upon the particular application of the invention. It can be readily ascertained by trial and error.

Except as described above, the operation of reactor 12 is essentially identical to that of the reactor disclosed in my U.S. Pat. Nos. 3,730,731 and 3,823,662. Green beans are introduced into an empty segment 180 of rotor 14 located above an imperforate segment 181 in annular array 40 (see FIG. 3) through inlet 50. Rotor 14 is then angularly indexed by drive mechanism 152 to register the just-filled segment 180 with the first of the nozzle plates or segments 42, permitting the heated fluid to flow upwardly through the segment and roast the beans therein. The segment is advanced stepwise, and roasting continues until the segment reaches dump opening 70. Here, the roasted beans drop through the dump opening and aligned openings 192 and 194 in support plate 36 and discharge flange 56 into discharge conduit 54. As described previously, the roasted beans flow from this conduit through a lock into a cooler where the roast is arrested and the beans cooled to ambient temperature to complete the process cycle.

It will be obvious to those skilled in the arts to which this invention pertains that many modifications may be made in the embodiment described above to optimize its performance for particular applications or for other purposes. Furthermore, it will be readily apparent to such persons that the novel reactor disclosed herein can be used for applications other than those specifically mentioned. All such applications and modifications of the present invention are therefore intended to be covered by the appended claims unless expressly excluded therefrom.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for processing particulate solids which includes a reactor comprising: a shell, means in said shell comprising a movable assembly for supporting a bed of solids to be processed; means for rotating said movable assembly about a vertical axis to thereby displace the solids in said shell from a first location in said reactor to a second location spaced around the reactor from the first location; an inlet means above said movable assembly through which solids can be charged into said assembly; and deflector means for keeping solids from falling between said movable assembly and said shell to the bottom of the reactor, said movable assembly having an outer wall means for confining, and delineating an outer boundary of, said bed which includes a first member and a second member spaced inwardly from and extending above the first member to form a gap through which solids charged into but falling outside said movable assembly can be reintroduced thereinto and said deflector means comprising a deflector extending inwardly from said shell to said outer wall means to direct solids falling outside said movable assembly through the gap between the first and second members of the outer wall means into the interior of said movable assembly.

2. Apparatus for processing particulate solids which includes a reactor comprising: a shell; means in said shell comprising a movable assembly for supporting a bed of solids to be processed, said movable assembly comprising an inner wall means which delineates the inner boundary of the bed supported by the movable assembly, outer wall means which delineates the outer boundary of said bed, and vertical partitions extending radially between said inner and outer wall means and said partitions and integrating the inner and outer wall means into a unitary structure and dividing the space therebetween into a plurality of radially extending segments; bearing means supporting said movable assembly for rotation about a vertical axis; means for rotating said movable assembly to thereby displace solids in said bed from a first location to a second location spaced around the interior of the shell from said first location, said means comprising a shaft extending through said shell to the interior of the reactor, means for rotating said shaft, and means fixing said movable assembly to said shaft for rotation therewith; means for so effecting a flow of process fluid upwardly through said shell as to cause the solids to circulate upwardly in the inner region of the bed and thereby come into uniform and intimate contact with the process fluid as said solids are displaced from the first to the second of the aforesaid locations, said means comprising a fluid inlet means for the process fluid, said fluid inlet means being disposed adjacent the lower end of said movable assembly, and the lower portions of the inner and outer wall means of said assembly converging toward and terminating adjacent said inlet means whereby process fluid flowing therethrough will flow upwardly through said movable assembly and the solids therein; and said movable assembly further including deflector means at the upper end of the inner wall means thereof for directing the upwardly moving solids toward the outer region of the bed and out of the mainstream of the upwardly flowing process fluid to thereby keep said solids from being carried out of the reactor by the process fluid as they circulate upwardly therein, said deflector having a horizontally oriented, curved, deflecting surface which changes in slope between a steeply and upwardly inclined inner edge and a downwardly inclined outer edge.

3. Apparatus for processing particulate solids which includes a reactor comprising: a shell; means in said shell comprising a movable assembly for supporting a bed of solids to be processed, said movable assembly comprising an inner wall means which delineates the inner boundary of the bed supported by the movable assembly, an outer wall means which delineates the outer boundary of said bed, and vertical partitions extending radially between said inner and outer wall means and said partitions and integrating the inner and outer wall means into a unitary structure and dividing the space therebetween into a plurality of radially extending segments; bearing means supporting said movable assembly for rotation about a vertical axis; means for rotating said movable assembly to thereby displace solids in said bed from a first location to a second location spaced around the interior of the shell from said first location, said means comprising a shaft extending through said shell to the interior of the reactor, means for rotating said shaft, and means fixing said movable assembly to said shaft for rotation therewith; means for so effecting a flow of process fluid upwardly through said shell as to cause the solids to circulate upwardly in the inner region of the bed and thereby come into uniform and intimate contact with the process fluid as said solids are displaced from the first to the second of the aforesaid locations, said means comprising a fluid inlet means for the process fluid, said fluid inlet means being disposed adjacent the lower end of said movable assembly, and the lower portions of the inner and outer wall means of said assembly converging toward and terminating adjacent said inlet means whereby process fluid flowing therethrough will flow upwardly through said movable assembly and the solids therein, said movable assembly further including deflector means at the upper end of the inner wall means thereof for directing the upwardly moving solids toward the outer region of the bed and out of the mainstream of the upwardly flowing process fluid to thereby keep said solids from being carried out of the reactor by the process fluid as they circulate upwardly therein, said deflector having a horizontally oriented, curved, deflecting surface which changes in slope between a steeply and upwardly inclined inner edge and a downwardly inclined outer edge; and deflector means for keeping solids from falling between said movable assembly and said shell to the bottom of the reactor, the outer wall means of said movable assembly having a first member and a second member spaced inwardly from and extending upwardly beyond the first member and said deflector means comprising a deflector extending inwardly from said shell to said outer wall means to direct solids falling outside said movable assembly through the gap between the first and second members of the outer wall means into the interior of said movable assembly.

* * * * *